United States Patent
Wu et al.

(10) Patent No.: US 6,510,274 B1
(45) Date of Patent: Jan. 21, 2003

(54) OPTICAL FIBER HOLDER

(75) Inventors: Kun-Tsan Wu, Tu-Chen (TW); Tsung Wei Chiang, Tu-Chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/994,424

(22) Filed: Nov. 26, 2001

(30) Foreign Application Priority Data

Oct. 12, 2001 (TW) ........................................ 90217383 U

(51) Int. Cl.⁷ .................................................. G02B 6/00
(52) U.S. Cl. ........................................ 385/137; 385/135
(58) Field of Search .......................... 385/137, 135–139, 385/134

(56) References Cited

U.S. PATENT DOCUMENTS 5,044,721 A * 9/1991 Nakamura .................. 385/137
5,530,785 A * 6/1996 Sakamoto et al. .......... 385/136
6,324,331 B1 * 11/2001 DeMeritt et al. ........... 385/134

* cited by examiner

Primary Examiner—Phan T. H. Palmer
(74) Attorney, Agent, or Firm—Wei Te Chung

(57) ABSTRACT

An optical fiber holder (2) includes a holding element (3) and a base (4). The base forms a flange (41) protruding above the rest of the base. A pair of slots (42) is defined between the flange and the rest of the base. The holding element defines a passageway (34) for containing a plurality of fibers (5) and forms a pair of fixing feet (31). The holding element is assembled onto the base with the fixing feet being engaged with the slots. When an outside force acts on fibers held in the passageway, the holding element can rotate relative to the base, within a fixed range, protecting the fibers from damage.

20 Claims, 6 Drawing Sheets

OPTICAL FIBER HOLDER

BACKGROUND OF THE INVENTION

1. Field of the Invention

The present invention relates to an optical fiber holder, and particularly to a rotatable optical fiber holder which can rotate within a fixed range when an outside force acts on fibers held within the optical fiber holder.

2. Description of Related Art

Optical fibers that are currently commercially available comprise a central glass core, a glass cladding that surrounds the core, and a coating of synthetic polymer material. The use of optical fibers is increasing for communication. Since optical fibers are thin and fragile, a reliable method of securing the optical fibers along an optical path is necessary.

Presently, traditional wire holders are most used for receiving and holding a plurality of loose fibers in an optical path. These presently used holders are commonly made of a polymer material, and are assembled on a base utilizing glue. These holders tend to be too rigid and wear out too quickly. Furthermore, these present holders can not rotate relatively to the base, so can not turn to reduce the bending of the fibers caused by outside forces acting on the fibers, and thus the fibers are easily damaged.

For example, referring to FIG. 6, Taiwanese Patent No. 311696 discloses a fiber holder comprising a base 11, a sliding block 12, a sliding element 13, and a screw 14. The sliding element 13 defines a plurality of grooves 131 for receiving optical fibers 15, and a center hole for receiving the screw 14. Fibers received in the grooves 131 are retained in the grooves 131 by screwing in the screw 14 until it presses against the fibers. The fibers 15 are thin and fragile, and are easily damaged when the screw 14 exerts too much pressure on the fibers. On the other hand, the fibers can easily fall out of the grooves 131 when the pressure exerted by the screw 14 on the fibers is too small.

A new optical fiber holder is desired which securely holds fibers without damaging the fibers, and which has a range of rotational movement which allows the fibers to flex under the influence of an outside force without damage to themselves.

SUMMARY OF THE INVENTION

An object of the present invention is to provide an improved optical fiber holder, and particularly to provide an optical fiber holder which allows a range of rotational movement of the fibers held therein.

An optical fiber holder of the present invention comprises a holding element and a base. The holding element is assembled onto the base and may rotate relative to the base when an outside force acts on fibers held within the holding element.

The holding element comprises a body, a pair of fixing feet, a bending portion and a side wall. A passageway is defined between the body, the bending portion and the side wall. A tip portion of the side_wall inclines outwardly. A deflexed portion of the bending portion extends downwardly from an end of the bending portion and is substantially perpendicular to the body. A guide slot is formed between the deflexed portion and the side wall and communicates with the passageway. The two fixing feet respectively extend from two opposite ends of the body and are formed in a step shape. Each fixing foot comprises a fixing portion and a flexible portion.

The base comprises a flange, a center portion and a peripheral portion. Two slots are formed between the flange and the center and peripheral portions.

In assembly, the two fixing feet are pressed inward toward each other until each fixing portion of each fixing foot can enter the slot beneath the flange. Pressure is removed from the fixing feet, allowing the fixing feet to spring outward, locking the holding element into the base.

In use, a plurality of fibers are inserted one by one into the passageway of the holding element through the guide slot.

Other objects, advantages, and novel features of the present invention will become more apparent from the following detailed description when taken in conjunction with the accompanying drawings.

DETAILED DESCRIPTION OF THE INVENTION

Figure 1:
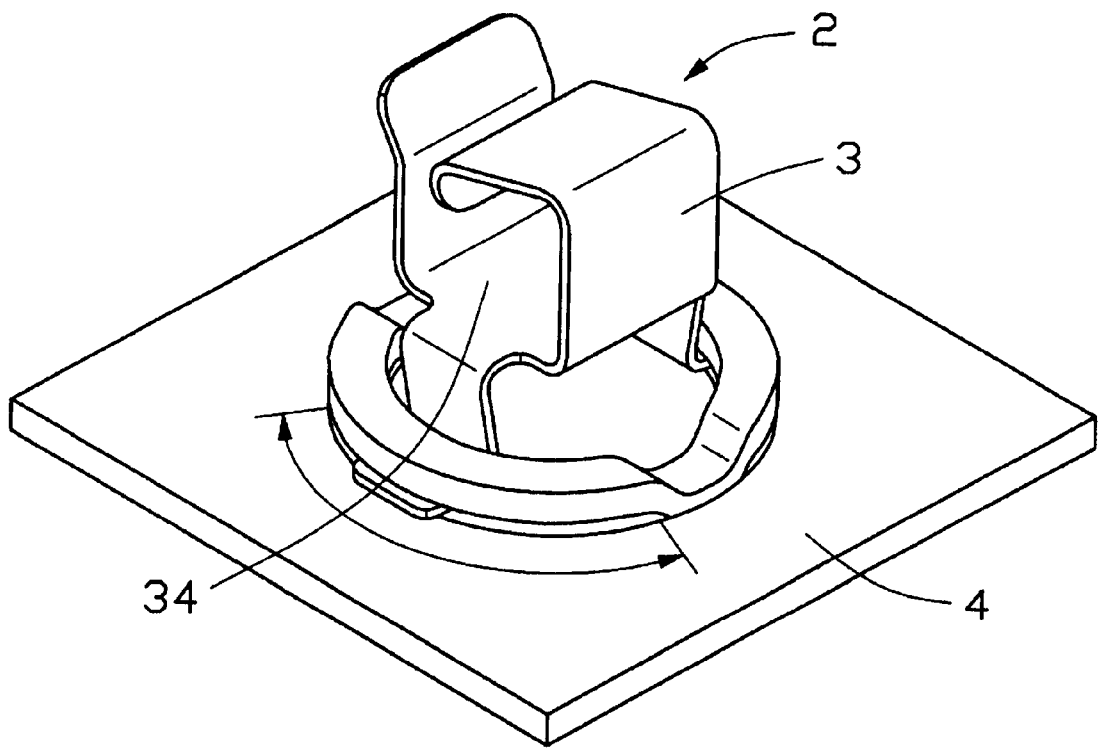
FIG. 1 is an assembled view of an optical fiber holder of the present invention.
Figure 5:
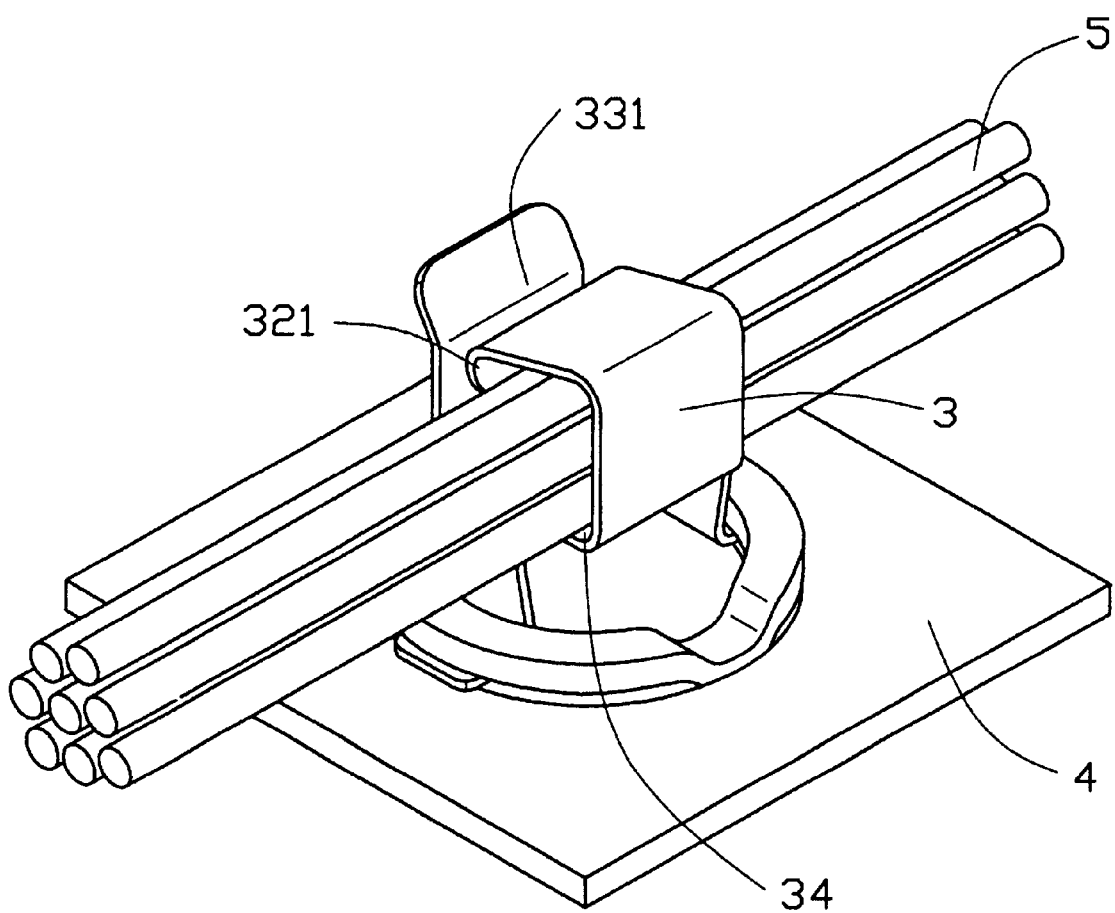
FIG. 5 is an assembled view of the optical fiber holder with fibers received therein.
Figure 6:
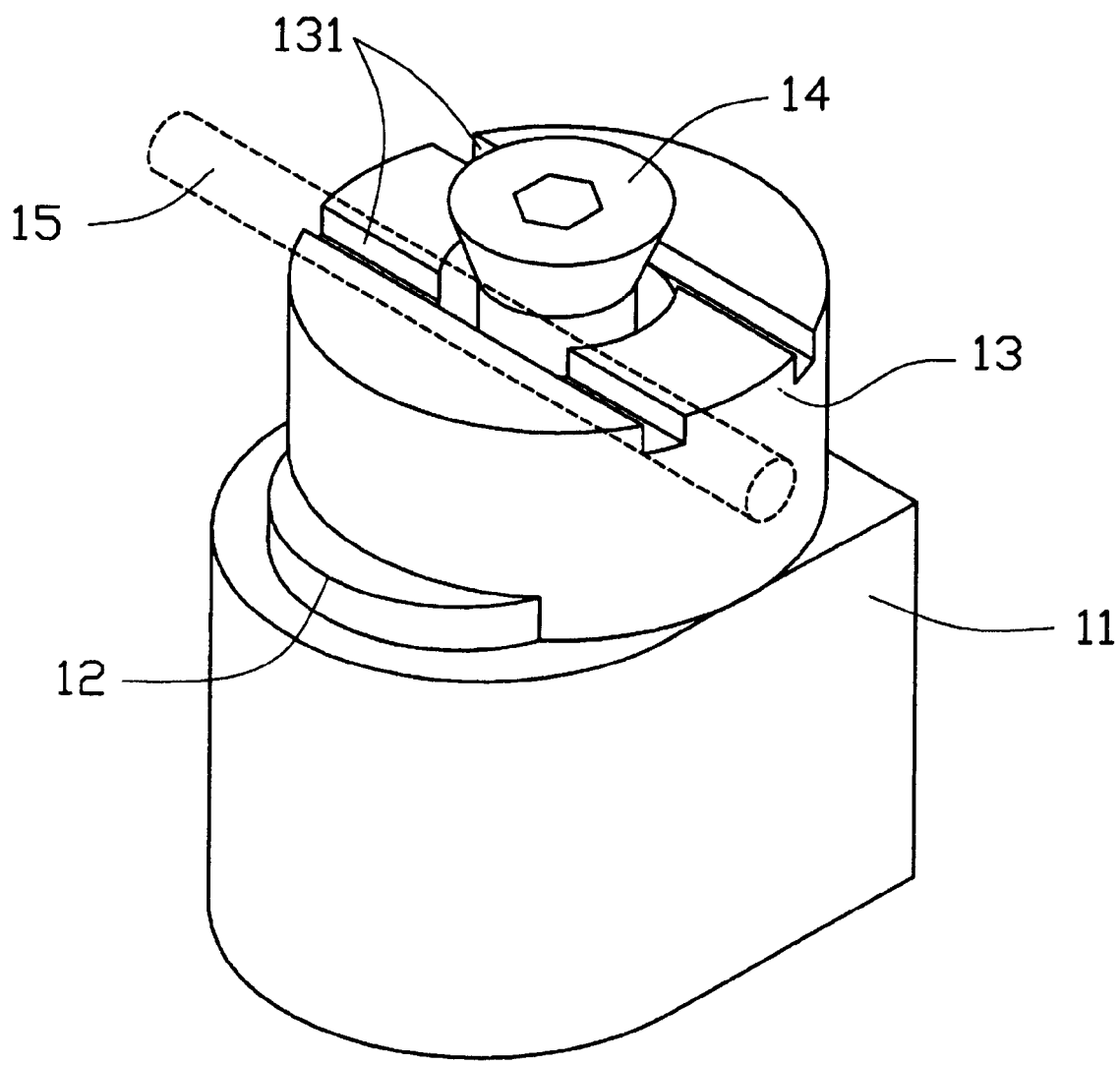
FIG. 6 is an assembled view of a fiber holder of the prior art.

As shown in FIGS. 1 and 5, an optical fiber holder 2 comprises a holding element 3 and a base 4. The holding element 3 defines a passageway 34 for containing a plurality of fibers 5. The holding element 3 is assembled onto the base 4 and may rotate relative to the base 4 when an outside force acts on the fibers 5. The holding element 3 is a single piece and may be formed by stamping and bending a metal sheet.

Figure 2:
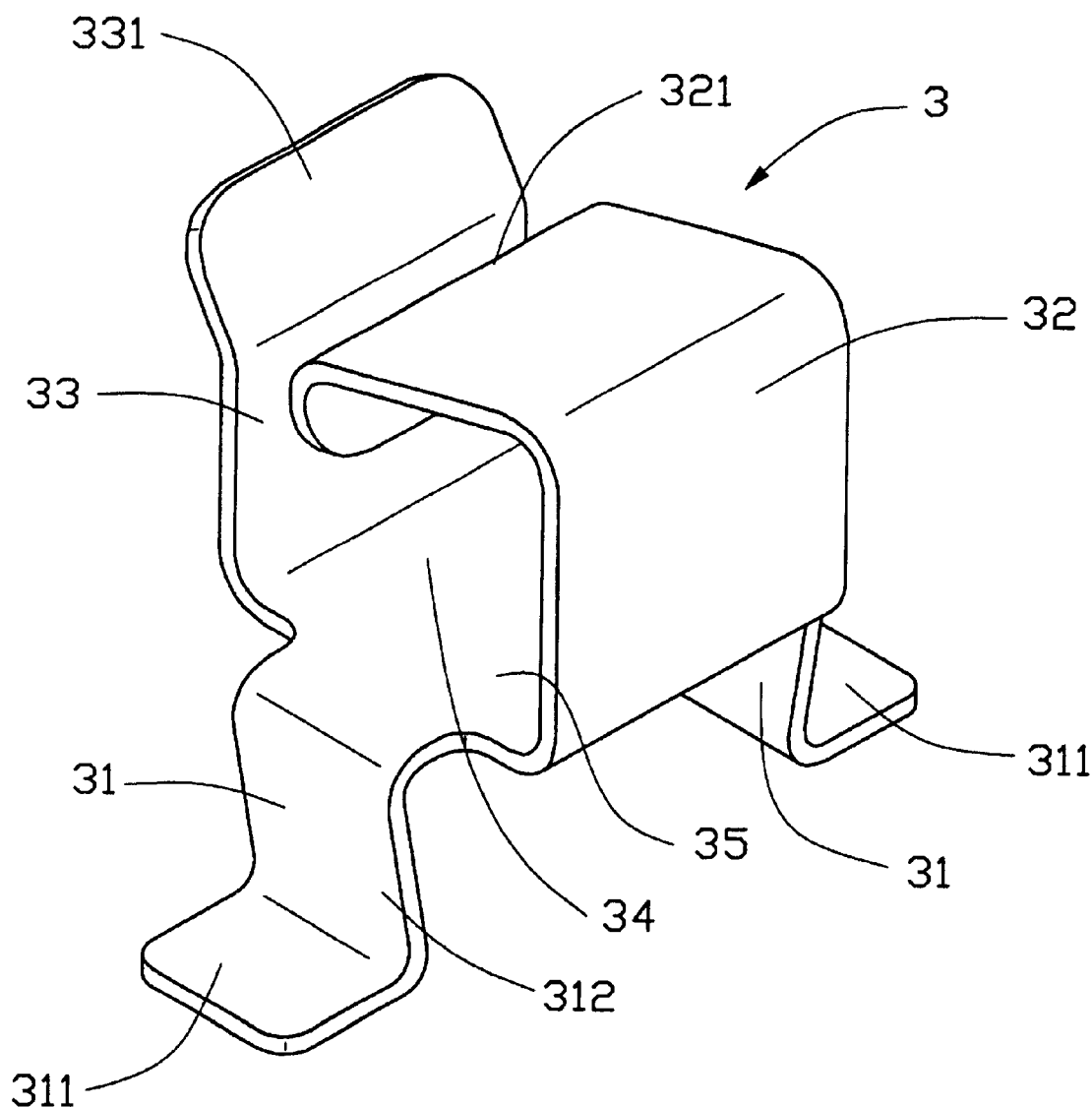
FIG. 2 is a perspective view of a holding element of the optical fiber holder.

As shown in FIG. 2, the holding element, 3 comprises a body 35, a pair of fixing feet 31, a bending portion 32 and a side wall 33. The passageway 34 is surrounded by the body 35, the bending portion 32 and the side wall 33. The side wall 33 extends upwardly from one side edge (not labeled) of the body 35. A tip portion 331 of the side wall 33 inclines outwardly. The bending portion 32 extends upwardly from an opposite side edge (not labeled) of the body 35, then bends horizontally at its upper portion. The bending portion 32 opposes the side wall 33 at its lower half, and opposes the body 35 at its upper half. A deflexed portion 321 extends downwardly from end of the bending portion 32 and is substantially perpendicular to the body 35. A guide slot (not labeled) is formed between the deflexed portion 321 and the side wall 33 and communicates with the passageway 34. The two fixing feet 31 respectively extend outwardly from two opposite end edges of the body 35, bending first downwardly and then outwardly to form a step shape. Each fixing foot 31 comprises a fixing portion 311 and a flexible portion 312.

Figure 3:
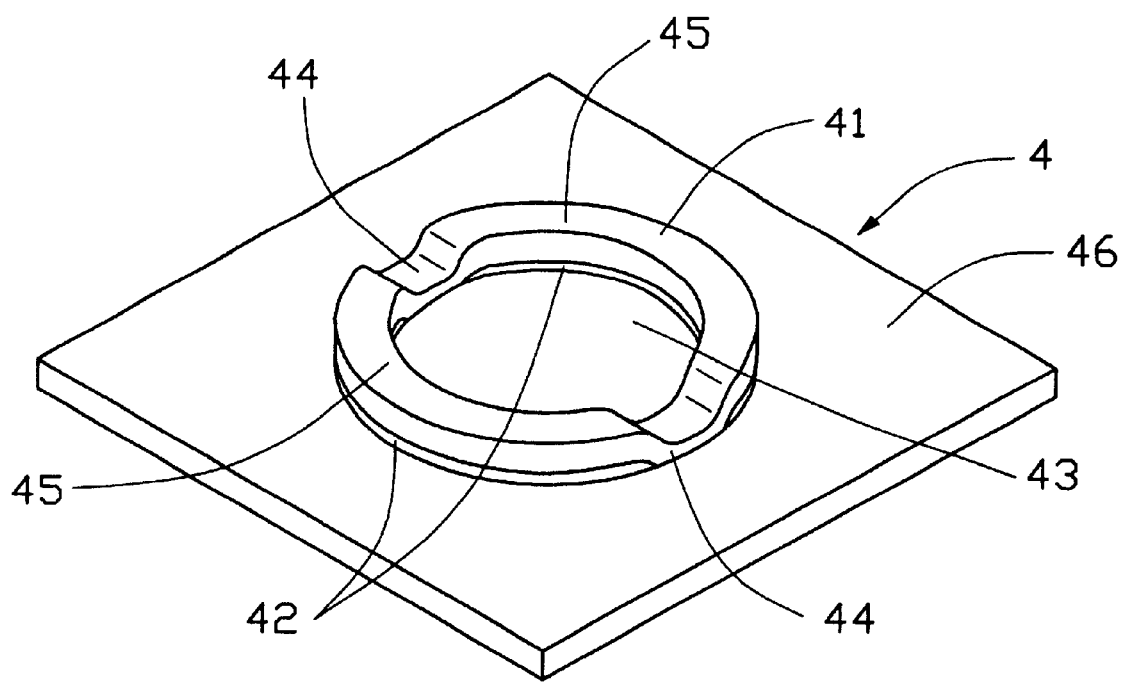
FIG. 3 is a perspective view of a base of the optical fiber holder.

As shown in FIG. 3, the base 4 comprises a flat peripheral portion 46 and center portion 43, and a raised flange 41. The flange 41 comprises two camber sections 45 and two connection sections 44. The flange 41 protrudes above the rest of the base 4 and can be formed by punching. The two camber sections 45 connect with the center portion 43 and the peripheral portion 46 through the two connection sections 44. Two slots 42 are formed between the two camber sections 45 and the center and peripheral portions 43,46.

Figure 4:
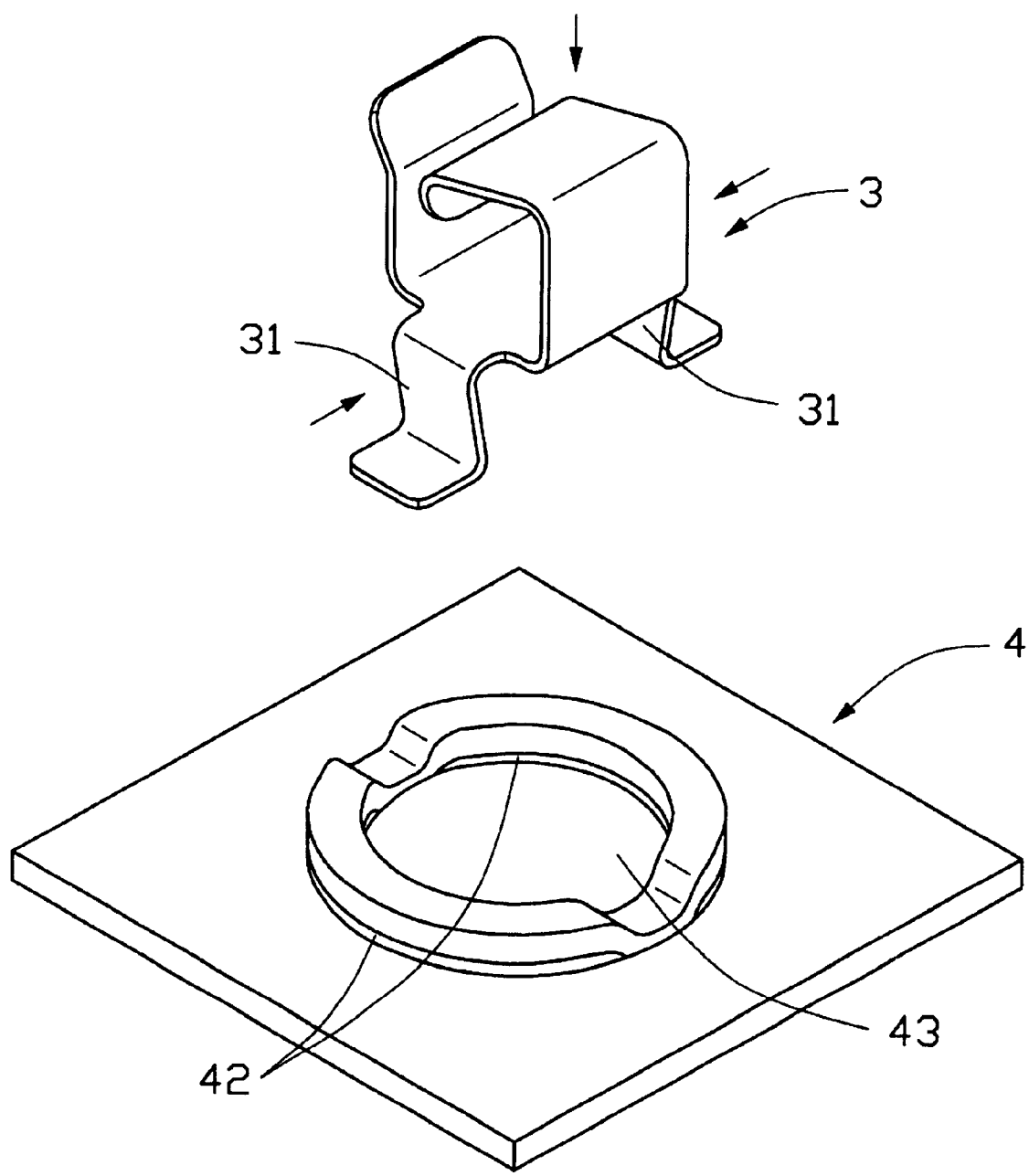
FIG. 4 is a perspective, exploded view of FIG. 1.

Referring to FIG. 2, FIG. 4 and FIG. 5, in assembly, the fixing feet 31 of the holding element 3 are pressed inwardly towards each other until the ends of the fixing portions 311 can be inserted into the slots 42 of the base 4. After the fixing portions 311 are engaged with the slots 42 (one fixing portion 311 per one slot 42), the fixing feet 31 are then released, allowing the fixing feet 31 to spring outwardly again, locking the holding element 3 to the base 4. The holding element 3 is then rotatable within a fixed range on the base 4 as the fixing portions 311 slide within the slots 42.

In use, a plurality of fibers 5 are inserted, one by one, through the guide slot (not labeled) and into the passageway 34 of the holding element 3. The deflexed portion 321 prevents the fibers 5 from disengaging from the holding element 3. The holding element 3 can rotate relative to the base 4, allowing the fibers 5 to bend more easily when outside forces are exerted on the fibers 5, thereby protecting the fibers 5 from being damaged.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optical fiber holder for holding a plurality of optical fibers, comprising:
   a base defining at least one slot;
   a holding element assembled on the base, the holding element comprising at least one fixing foot which is received in the at least one slot, the holding element defining a passageway for containing the fibers therein, the holding element being rotatably moveable relative to the base, thereby allowing the fibers to bend more easily when an outside force acts against the fibers.

2. The optical fiber holder as claimed in claim 1, wherein the base further comprises a flange, a center portion and a peripheral portion.

3. The optical fiber holder as claimed in claim 2, wherein the flange comprises two camber sections and two connection sections.

4. The optical fiber holder as claimed in claim 3, wherein the at least one slot is two slots formed between the two camber sections and the center and peripheral portions.

5. The optical fiber holder as claimed in claim 4, wherein the at least one fixing foot is two fixing feet extending from two opposite ends of the holding element, and the two fixing feet are received in the slots, one in each slot.

6. The optical fiber holder as claimed in claim 1, wherein the holding element comprises a body, a side wall and a bending portion, and the passageway is defined between the body, the side wall and the bending portion.

7. The optical fiber holder as claimed in claim 6, wherein the holding element comprises a deflexed portion extending from an end of the bending portion and a tip portion extending outwardly from the sidewall, and a guide slot for admitting entrance of fibers into the passageway is formed between the deflexed portion and the side wall.

8. An optical fiber holder for mounting fibers along an optical path, comprising:
   a base;
   a holding element assembled to the base, the holding element comprising:
   a horizontal body having a first edge and a second edge opposite each other;
   a side wall bending and extending upward from the first edge of the body; and
   a bending portion bending and extending upward from the second edge of the body, opposed to the side wall, then bending inwardly substantially horizontally, toward the side wall and opposed to the body, then bending downwardly toward the body as a deflexed portion, said deflexed portion being in close proximity to the side wall;
   wherein a passageway is defined between the body, the side wall and the bending portion for containing the fibers, and a guide slot is formed between the deflexed portion and the side wall, the guide slot communicates with the passageway, for admitting entrance of one or more fibers into the passageway.

9. The optical fiber holder as claimed in claim 8, wherein the base comprises a peripheral portion, a center portion and a flange.

10. The optical fiber holder as claimed in claim 9, wherein the flange protrudes above the peripheral and center portions and comprises two connection sections and two camber sections.

11. The optical fiber holder as claimed in claim 10, wherein two slots are formed between the two camber sections and the center and peripheral portions.

12. The optical fiber holder as claimed in claim 11, wherein the holding element further comprises two fixing feet, which extend from two opposite ends of the body.

13. The optical fiber holder as claimed in claim 12, wherein the two fixing feet are receivable in the two slots, and are slidable therein, allowing rotation of the holding element relative to the base when an outside force acts upon the fibers held within the holding element.

14. An optical fiber holder for mounting a plurality of fibers along an optical path, comprising:
   a base lying substantially in a plane;
   a holding element assembled to the base and rotatable about an axis orthogonal to a plane of the base, the holding element comprising a substantially tubular wall and a mounting element, the mounting element being in rotational engagement with the base, the tubular wall having a hole defined along the axis of the tubular wall, the axis of the tubular wall being perpendicular to the axis of rotation of the holding element, the plurality of fibers being accommodated within the tubular wall with the axis of the fibers being substantially parallel to the axis of the tubular wall.

15. The optical fiber holder as claimed in claim 14, wherein the tubular wall of the holding element has a guide slot through the tubular wall, to allow entrance and removal of the fibers.

16. The optical fiber holder as claimed in claim 15, wherein the mounting element of the holding element comprises a pair of feet, which rotatably engage with a pair of slots defined in the base.

17. An optical fiber assembly comprising:
   a base;
   a holding element mounted on the base, said holding element defining fixing feet portions rotatably engaged with the base, a side wall cooperating with a bending portion defining a passageway in communication with an exterior along a longitudinal direction, a guide slot formed in said holding element and communicating said passageway with said exterior in a lateral direction perpendicular to said longitudinal direction; and at least one optic fiber inserted through said guide slot into the passageway and extending along said longitudinal direction.

18. The assembly as claimed in claim 17, wherein a deflexed portion is formed around the guide slot for preventing said at least one fiber from withdrawal from the holding element.

19. The assembly as claimed in claim 17, wherein a width of said guide slot is dimensioned not too larger than a diameter of said at least on fiber.

20. The assembly as claimed in claim 17, wherein an inclined tip is formed around the guide slot.

* * * * *